Sept. 1, 1970   H. E. BENNS   3,526,561
INFLATABLE BLADDER TIRE BUILDING DRUM
Filed April 10, 1967   5 Sheets-Sheet 3
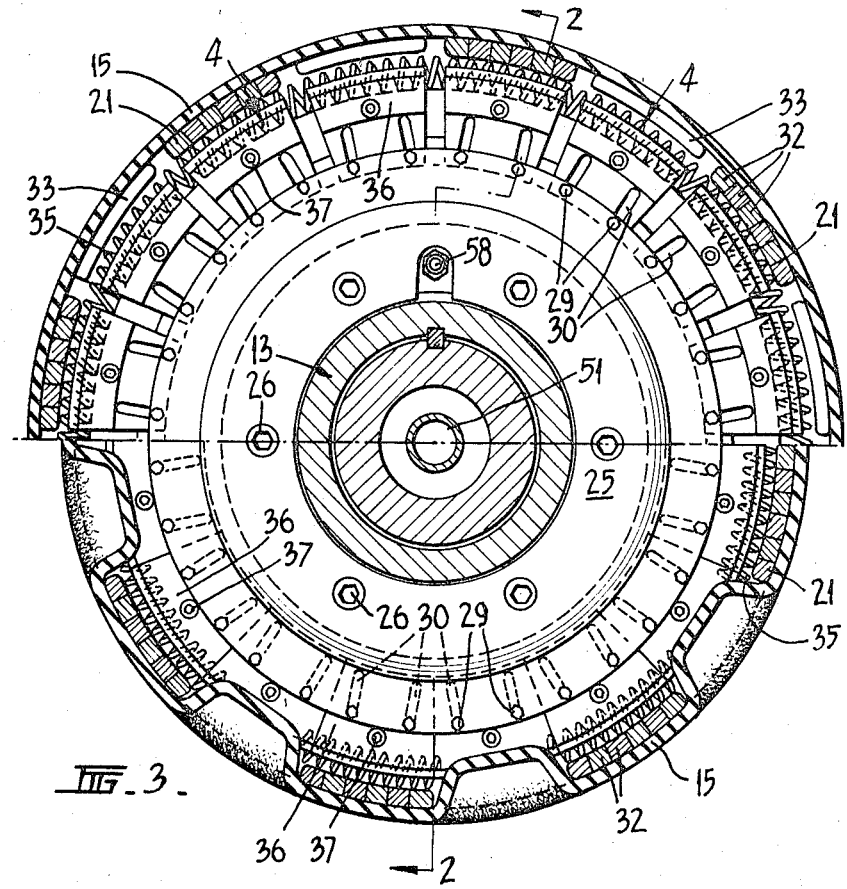
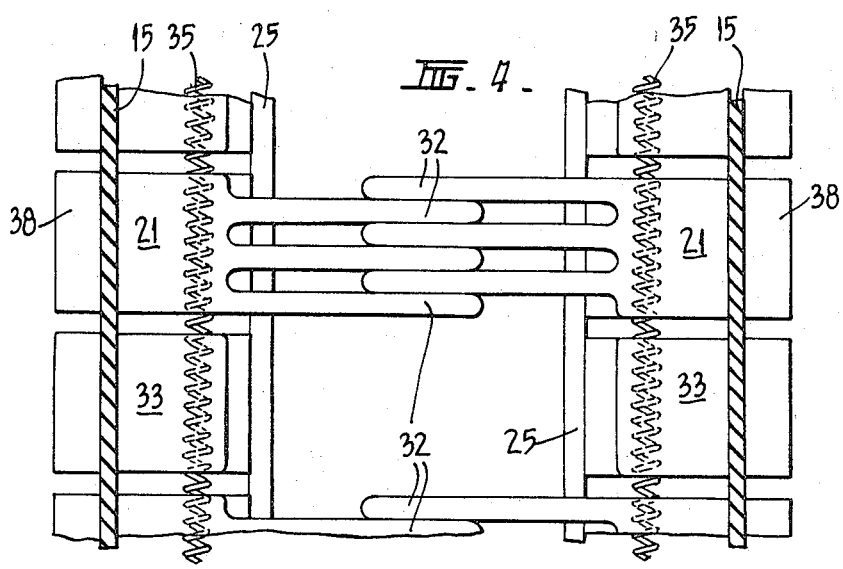
Inventor
Henry E. Benns
By Cushman, Darby & Cushman
Attorneys

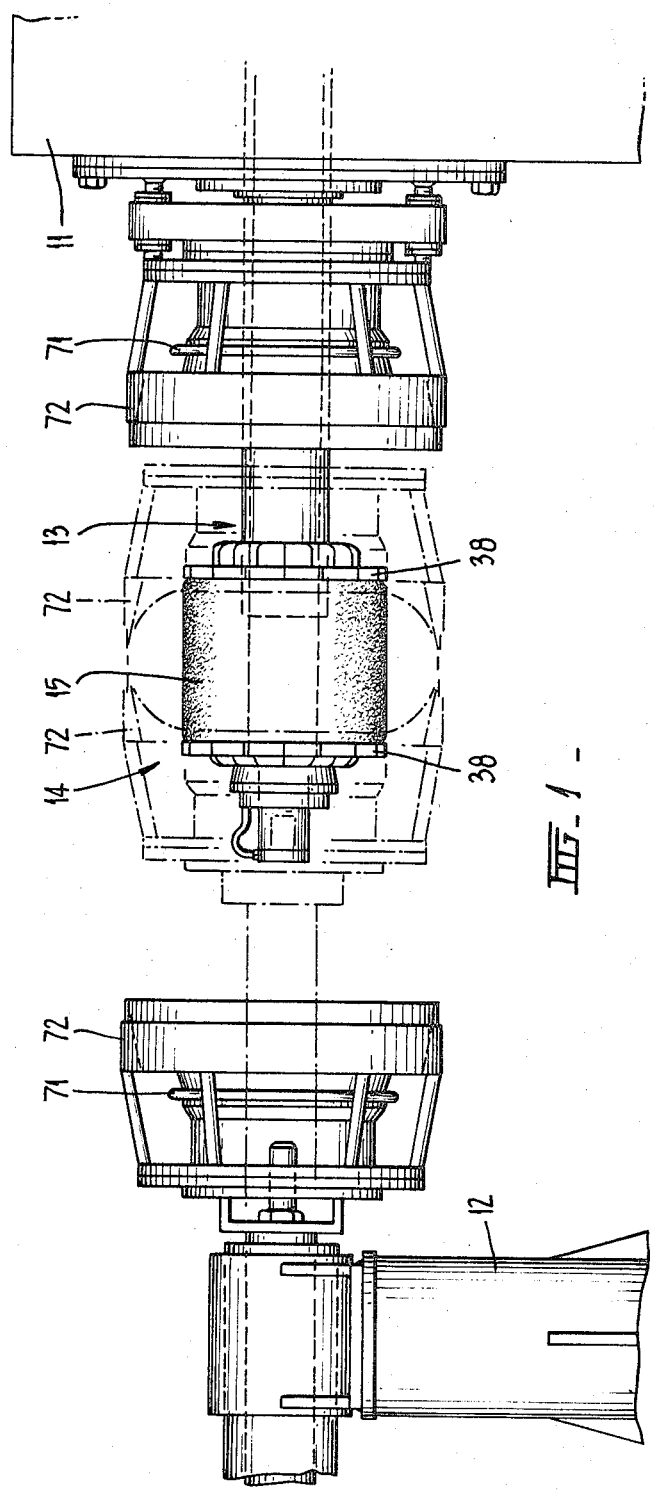

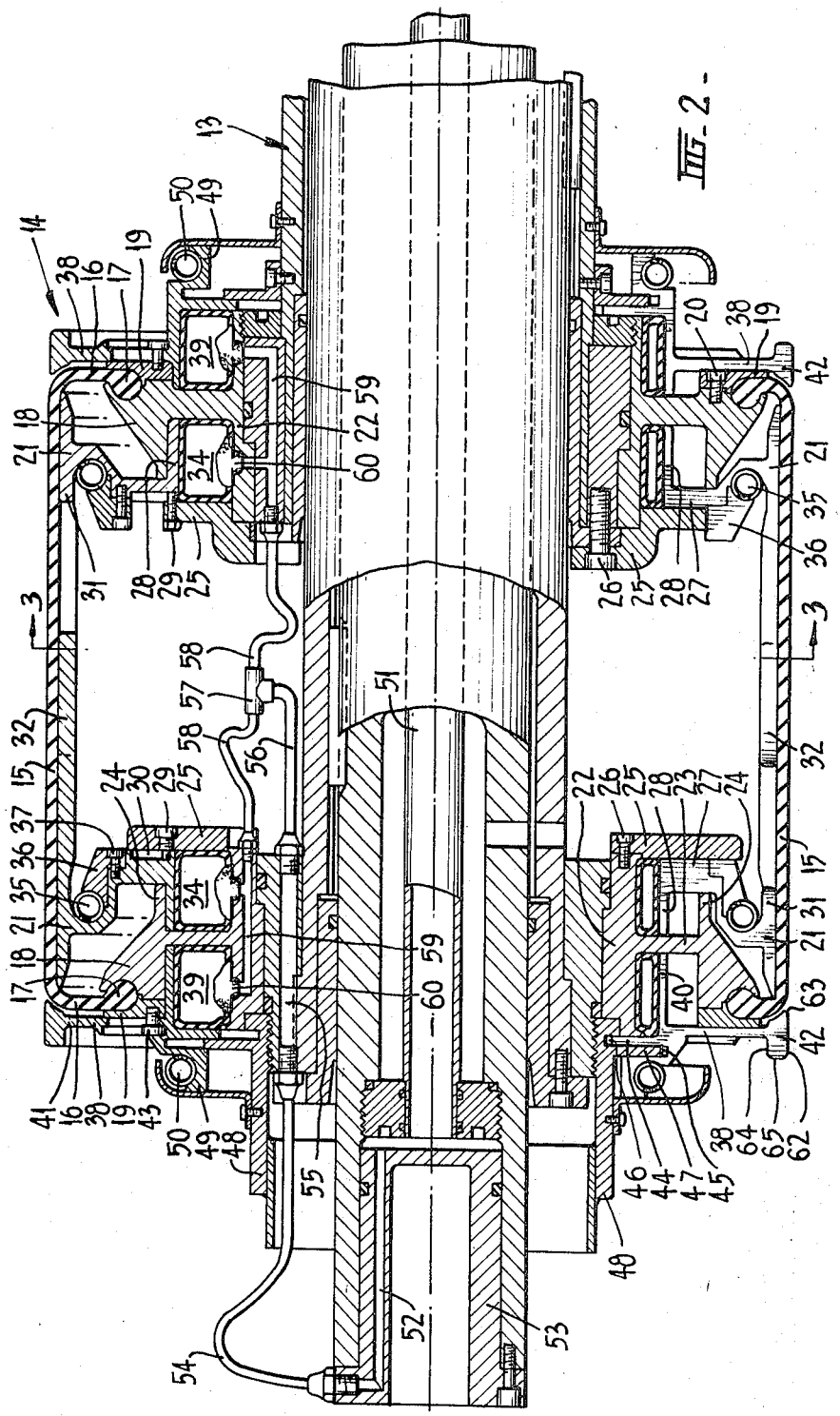

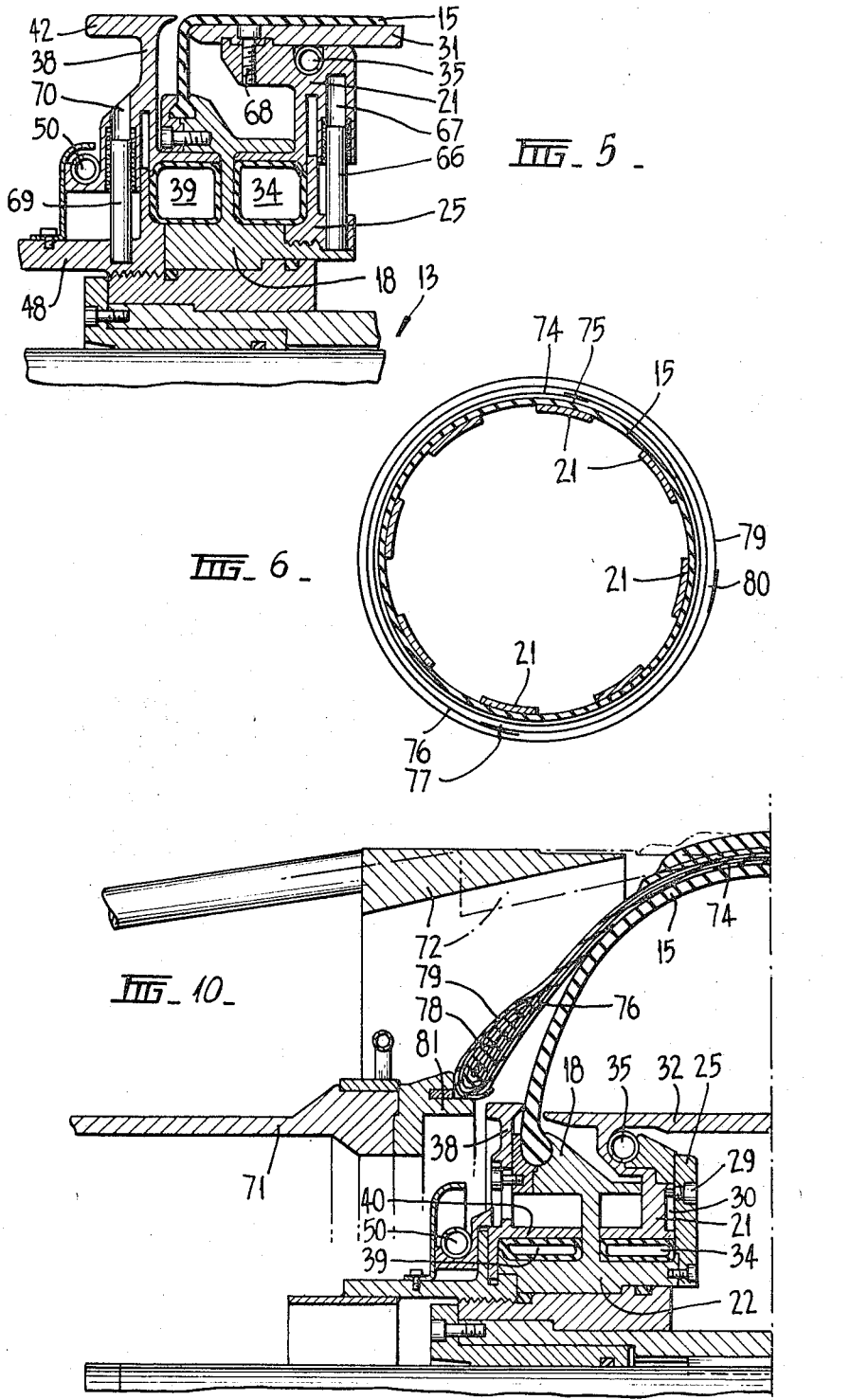

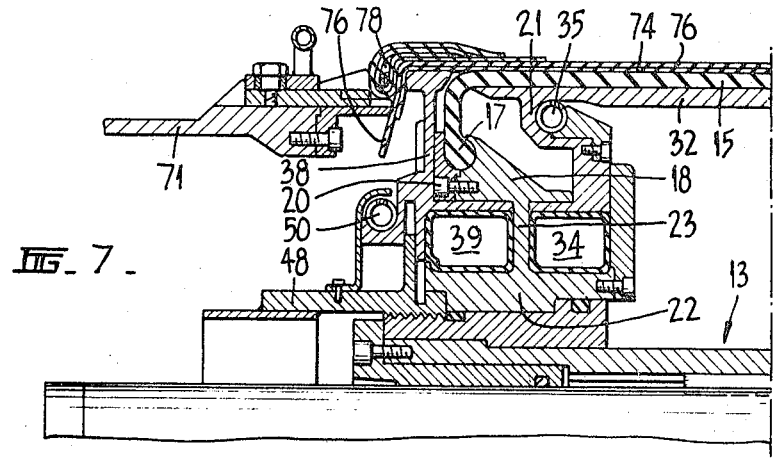
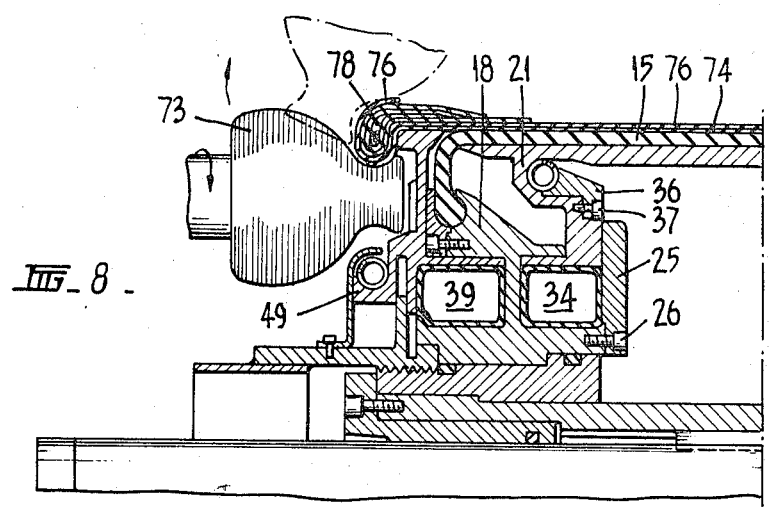
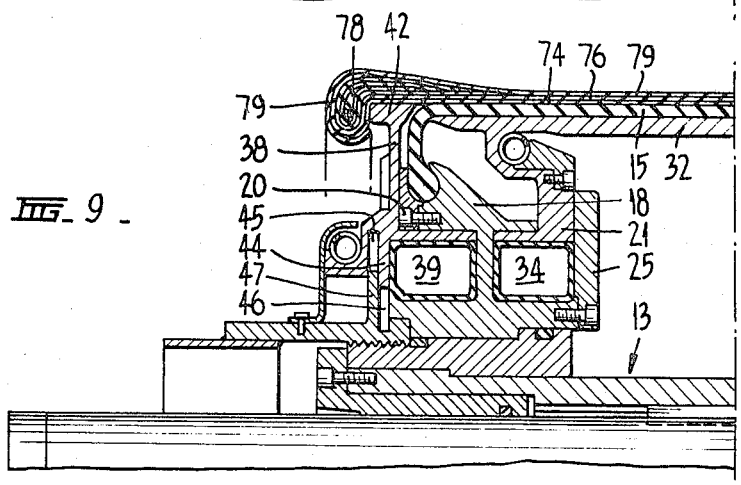

United States Patent Office 3,526,561
Patented Sept. 1, 1970

3,526,561
INFLATABLE BLADDER TIRE BUILDING DRUM
Henry E. Benns, North Brighton, Victoria, Australia, assignor to The Olympic Tyre & Rubber Company Proprietary Limited, West Footscray, Victoria, Australia
Filed Apr. 10, 1967, Ser. No. 629,550
Claims priority, application Australia, Apr. 13, 1966, 4,126/66
Int. Cl. B29h *17/16*
U.S. Cl. 156—416          10 Claims

ABSTRACT OF THE DISCLOSURE

A tire building apparatus having an inflatable cylindrical elastomeric bladder expandable under pressure to a toroidal form and mounted on a shaft assembly by clamping rings which engage integral beads on the ends of the bladder. Arcuate radially movable segments in the clamping rings support the bladder at different cylindrical diameters. Further arcuate radially movable outer segments are located beside the ends of the bladder, and tire bead support rings and breaker forming bells are movable into proximity to the bladder.

---

This invention relates to improvements in and connected with tire building apparatus and is concerned more particularly with an improved tire building drum and associated equipment for use in the manufacture of radial ply tires and other tires having rigid belt breakers under the tread.

With the development of high performance motor vehicles in recent times there has been an increased demand for radial ply pneumatic tires, i.e. tires wherein the reinforcing cords in the tire casing extend at an angle of almost 90° to the mid-circumferential line of the tire. Such tires are also characterised by the provision of a rigid belt breaker under the tread. Tires of this nature require considerable precision in their building, and a more involved building technique, and hitherto it has been considerably more costly to build a radial ply tire than a corresponding tire of the more conventional cross bias type.

It is an object of this invention to provide improvements whereby radial ply tires and other tires having rigid belt breakers may be produced more economically than hitherto and with this object in view the invention is broadly characterised, according to one aspect thereof, by the provision of an inflatable elastomeric bladder capable of being deformed between a cylindrical and a toroidal form.

According to a feature of the invention the said bladder may be provided with radially inwardly facing ends each terminating in a bead, and means may be provided for gripping said beads in order to support the bladder and facilitate the change in shape of the bladder.

Other aspects of the invention will be apparent from the following description of a preferred form thereof. In this description reference is made to the accompanying drawings, wherein:

FIG. 1 is a view in elevation of the main parts of a tire building apparatus according to this preferred form of the invention, FIG. 2 is a view on a larger scale and in section on line 2—2 of FIG. 3, of a tire building drum forming part of the apparatus shown in FIG. 1, the upper and lower parts of FIG. 2 showing parts of the drum in different aperture positions, FIG. 3 is a view of the drum in section on line 3—3 of FIG. 2, FIG. 4 is a developed fragmentary view of the drum in the direction indicated by the arrows 4 in FIG. 3, FIG. 5 is a fragmentary sectional view of a drum showing a modified form of construction, FIG. 6 is a diagrammatic cross-section through the drum of FIGS. 1 to 4 illustrating the desirable manner of building up a liner and plies in the drum, and FIGS. 7 to 10 are fragmentary views in radial section of part of the drum and associated parts of FIGS. 1 to 4 showing stages in building a tire on the drum.

Referring firstly to FIG. 1 of the drawings, there is shown therein tire building apparatus comprising a frame 11 and an outer stand 12 with a shaft assembly 13 extending from the frame 11 and supported by the stand 12. The shaft assembly 13 carries a tire building drum 14 which is shown in greater detail in FIGS. 2, 3 and 4, and which includes as an essential part of it an inflatable elastomeric bladder 15. The bladder 15 is normally in the form of a cylinder of an appropriate diameter to suit the size of the tire which it is to produce, the cylinder having integral radially inwardly directed ends 16 each of which terminates in an enlarged bead 17 which is also integral with the remainder of the bladder.

The bead 17 at each end of the bladder is gripped between two clamping rings 18, 19 having mating recesses in which the beads are located. The two inner clamping rings 18, one at each end of the drum, are supported in the shaft assembly 13, one or both of them being mounted so as to be capable of sliding in the axial direction of the shaft assembly under the action of controlling mechanism in the frame 11, whereby the bladder beads 17 may be moved towards or away from each other. The outer clamping rings 19 are fastened to the inner clamping rings 18 by screws 20 (shown in FIGS. 7 to 10).

The annular cavity enclosed by the bladder and the inner clamping rings 18 is sealed from the atmosphere and a connection into this cavity is provided through the interior of the shaft assembly 13 whereby the bladder can be placed under superatmospheric pressure to expand it or under reduced pressure to contract it.

The tire building drum also includes a plurality of bladder support segments 21 which are mounted on the inner clamping rings 18. For this purpose each inner clamping ring comprises an annular portion 22 which seats on part of the shaft assembly with an integral radial wall 23 and an outer annular portion 24 integral therewith. These portions of each ring 18 define an annular cavity of rectangular section which is partially closed by means of an annular plate 25 fastened to the inner side of the clamping ring by screws 26. The portion 22 extends further from the wall 23 than the portion 24 whereby a continuous opening into the annular cavity is left at the radially outer side thereof. Each bladder support segment 21 comprises a stem 27 with an integral foot 28. The foot 28 is shaped as a segment of a thin annulus having a width corresponding to the width of the annular cavity in the clamping ring 18, whereby the foot will seat within the cavity, and the stem extends from the foot in a direction radial to the drum through the opening from the annular cavity.

Each bladder support segment 21 is capable of moving in the radial direction, this movement being controlled and limited by means of screws 29 fitted in the annular plate 25 and extending into parallel slots 30 in the face of the stem 27. The radially outer ends of the stems 27 of the bladder support segments 21 are cranked in the axially outward direction and are integral with plates 31 which are substantially rectangular in outline and extend in a direction parallel to the drum axis within the cylindrical portion of the bladder 15. The plates 31 are given a slight curvature appropriate to their radius from the drum axis so that they combine to give a substantially cylindrical support to the bladder 15 although as indicated below this cylindrical support is not continuous.

For each bladder support segment mounted in one of the inner clamping rings 18 there is a corresponding bladder support segment mounted in the other inner clamping ring directly opposite it. The plates 31 of the segments are slotted in the axial direction as clearly indicated in FIG. 4 whereby each segment plate 31 has fingers 32 which engage between the corresponding fingers of the plate 31 directly opposite it. Hence in the movement of the clamping rings 18 towards and away from each other the fingers 32 move within the slots and thus maintain a substantially cylindrical supporting surface for the bladder 15, of variable width according to the relative position of the clamping rings 18.

The bladder supporting segments 21 extending around each inner clamping ring 18 alternate with spacing segments 33 which are similar to the segments 21 except that they are not provided with fingers but instead the outer plates thereof extend axially inwardly for only a short distance so that even when the clamping rings 18 are in their closest relative positions there is still a gap between the axially inner ends of the opposite pairs of spacing segments 33.

To move the segments 21 and 33 radially outwardly there is provided an annular airbag 34 of rubber or other suitable resilient material disposed in the annular space within each inner clamping ring radially inwardly of the feet 28. By inflating this airbag each segment is moved radially outwardly to the maximum extent possible. Return movement of the segments is effected by means of a helical tension spring ring 35 which is fitted in a stretched condition into an annular cavity formed between the cranked part of the stems 27 and the blades 31, and held in position by inserts 36 retained by screws 37.

As indicated in FIG. 3 there are eight supporting segments 21 and eight spacing segments 33 at each end of the drum assembly. This quantity may be varied for different tire sizes but in all cases the numbers are desirably as great as will completely fill the available space when the segments are all at the radially innermost positions and hence there are only small gaps between them in the circumferential direction when the airbag 34 is inflated to move them all to the radially outermost positions.

Due to the provision of the spacing segments 33 the cylindrical support for the bladder 15 has at circumferentially spaced regular intervals rectangular cavities into which part of the cylindrical portion of the bladder can be drawn by reducing the pressure within the bladder.

The tire building apparatus of FIGS. 1 to 4 also includes a plurality of outer ring segments 38 disposed to provide supports at the edges of the cylindrical portion of the bladder 15, and mounted in a similar fashion to the segments 21 and 33. For this purpose the annular portion 22 of each inner clamping ring 18 extends beyond the radial wall 23 to the axially outer side as well as axially inwardly and so also does the axially outer annular portion 24. Thus there is defined a further annular cavity which houses a second annular airbag 39. Each segment 38 has a foot 40 which engages in the recess in contact with the airbag 39, an integral stem 41 which extends radially outwardly beside the end wall 16 of the bladder and a head 42 formed in the outer end of the stem 41. The segments 38 are retained and guided by screws 43 extending through radially extending slots in the stems 41 and fastened to the outer retaining rings 19. The segments 38 also have radially inwardly directed fingers 44 and slots 45 which engage with corresponding slots 46 and fingers 47 in rings 48 which are mounted on the shaft assembly 13 in conjunction with the bladder clamping rings 18. In addition the segments 38 have axially directed projections 49 providing a seating for another helical tension spring ring 50 which serves to draw the segments 38 radially inwardly in opposition to the annular airbag 39.

Expansion of the airbags 34 and 39 is effected by delivering air under pressure through a pipe 51 within the shaft assembly 13, through a passage 52 in an end fitting 53, through a pipe line 54, passage 55, and pipe line 56 into a branching connection 57 within the bladder 15 and thence through flexible pipe lines 58 to passages 59 within the bladder clamping rings 18, and through connections 60 into the airbags.

The head 42 of each outer ring segment 38 projects axially inwardly and outwardly, and its outer surface 62 is curved to approximately the same curvature as the plates 31 of the segments 21. At the axially inner side the edge of the head 42 is cut away concavely to accommodate the adjacent convexly curved part of the bladder 15, and to leave a feather edge 63 with the object of reducing to a minimum the annular space between the surface 62 and the adjacent surface of the bladder 15. At the radially outer side the head has a projection with a radially inner face 64 parallel to the surface 62, and an end face 65 at right angles thereto. It is convenient for the number of outer ring segments 38 at each end of the drum to be the same as the sum of the segments 21 and 33 at each end, but the numbers may differ.

Referring now to FIG. 5 there is shown therein a modified arrangement of the segments and the retaining means therefor. In this arrangement the annular plate 25 retaining the airbag 34 and the segments 21 and 33 is screwed into position instead of being held by separate fastenings and the segments are guided by means of cylindrical pins 66 which are fixed in the plate 25 and fitted in cavities 67 in the segments. The plates 31 are separate from the remainder of the segments and are held by screws 68, and the tension spring ring 35 is mounted in recesses which are covered by the plates 31. The outer ring segments 38 are also mounted on and guided by pins 69 which project from the rings 48 and engage in cavities 70 in the segments. It will be evident that some of the details of FIG. 5 may be used in conjunction with other details of FIGS. 1 to 4 and that other modifications of construction may also be employed.

Reverting to FIG. 1 the tire building apparatus shown includes two bead support rings 71 of known construction and two coaxially supported bells 72 also of known construction. As indicated by the dotted lines the bead support rings 71 can be drawn into operative association with the tire drum 14, and so also can the bells 72. Movement of the rings 71 and bells 72 is effected by means, not shown, operative from within the frame 11.

The bells 72 assist in the laying of the rigid belt breaker and tread, while the bead support rings 71, one of which is shown in greater detail in FIGS. 7 and 10 serve to help position the tire bead assemblies accurately against the ply or plies on the building drum. More importantly the rings 71 also serve to support the tire beads during shapping of the drum and tire to a toroidal form, and while it is maintained in that form.

The equipment also includes conventional stitching and forming tools such as the lock-up roller 73 shown in FIG. 8.

In one method of building a tubeless tire with an inner liner, two radial plies and a one-up, one-down lock-up construction, using the equipment described, bead assemblies are placed on the bead support rings 71. Building is then commenced with the bladder 15 tensioned in the axial direction, but deflated and connected to a vacuum source so that the surplus periphery of the bladder is drawn into the rectangular spaces between the bladder support segments 21. The vacuum is relatively low at this stage and is limited to the order of a few inches of mercury so that subsequent inflation pressure in the annular airbags for the purpose of moving the segments 21 and 38 radially outwardly can be kept to a minimum.

A length of inner liner 74 sheeted to the desired thickness and width is withdrawn from a nearby storage turret (not shown), and a continuous band of inner liner 74 is formed on the building drum as shown diagrammatically in FIG. 6.

The splice 75 is made on part of the bladder which is supported by a pair of the support segments 21 provided for this purpose. Special techniques may be required to effect this splice but it must be positioned in a part of the main bladder periphery which is well supported right across the axial length of the bladder and therefore as far as practical from the depressions in the bladder periphery.

The first tire ply 76 is then withdrawn from the nearby storage turret and is banded up on the inner liner so that its splice 77 is 180° away from the inner liner splice. By means of the bladder-support-segments and with the assistance of witness marks placed on the sides of the building drum assembly, the splicing of the first tire ply is thus effected on a part of the main bladder periphery which is well supported. As the cords in the carcass plies of tires which use belt breakers have an angle close to 90° to the mid-circumferential line of the tire, there will be little difficulty in positioning the ends of a ply for the splicing operation to give rigid support to the full axial length of the splice.

The two annular airbags 34 and 39 at each side are then inflated so that the support segments 21 are moved to their radially outermost positions and so also are the shoulder support segments 38. The radially outward movement of the support segments expands the first ply and inner liner assembly, so that it is drawn taut on the bladder and any wrinkles are eliminated. The edges of the first ply 76 and inner liner 74 project from the sides of the building drum assembly and as a result of inflation of the annular airbags 34 and 39 these edges are turned down over the edges of the outer ring segments 38 ready to receive the bead assemblies 78. The bead support rings are moved axially inwards to the location shown in FIG. 7 to position the bead assemblies 78 against the turned down ply 76 and the plies of the bead assemblies are stitched to the ply 76. The bead support rings are then retracted and the lock-up rollers 73 are engaged under the edges of the ply-inner liner assembly to lock-up the ends around the bead assemblies during rotation, as shown in FIG. 8.

The lock-up rollers are then withdrawn and the second ply 79 is fed from the storage turret to bank-up on the initial tire assembly. The splice 80 is effected at 90° as shown in FIG. 6 or any other preferred location from the previous ply splice 77 and the arrangement of the cavity bladder-support segments with the assistance of witness marks are such that this splice is also carried out on a part of the main bladder periphery which is well supported.

Conventional tools (not shown) are then brought into engagement to lock the edges of the second ply 79 down around the tire bead assemblies as shown in FIG. 9. Chafer and sidewall plies may also be part assembled on the partially-built tire at this stage.

All tools are then withdrawn, and the periphery of the bead supporting rings 71 is slightly reduced by effecting movement of cam mechanism through operation of the bead supporting ring handwheels. The bead supporting rings 71 are then moved towards the partly-built tire assembly with the lip 81 protruding from each ring engaged under the corresponding bead of the tire as shown in FIG. 10. The reduction in circumference of the bead supporting rings enables them to accommodate the tire beads which now have a reduced internal circumference as a result of the plies being locked around them. The pressure is then released from all the annular airbags. Release of pressure from the annular airbags enables the spring rings 35 and 48 to retract all segments to their radially inner limit and results in the partially-built tire being transferred from internal location on the drum assembly to external location on the bead supporting rings. The tire profile is then changed from a cylindrical shape into a toroidal shape by inflation of the main bladder as shown in FIG. 10. At the same time the main bladder locking rings are moved axially inwards to assist expansion of the bladder.

Inflation pressure to the bladder is controlled to give the desired toroidal profile and the bead ring lips continue to hold the tire beads at the desired diameter when shaped and to centre the tire. The bells 72 are moved inwardly to the position shown in dotted lines in FIGS. 1 and 10 and the belt breaker and tire tread are then withdrawn from nearby storage areas and assembled on the bells and then transferred to the ply 79. Stitching of the completed tire is optionally carried out using conventional pressure-actuated tools.

Thereupon, the main bladder is deflated and full vacuum is applied, the bead support rings are retracted, and the bladder rings are moved axially outwardly with the result that the outer diameter of the bladder is reduced to its minimum value which is smaller than the tire bead diameter. This allows the shaped, built tire to be removed from the machine for later vulcanisation. The resultant axial stretching of the bladder assists in removing surplus bladder periphery so that a wrinkle-free outer bladder periphery can be obtained when the vacuum is adjusted to a relatively low level prior to building the next tire.

Other variations to these techniques are possible but it will be seen that the building drum assembly is able to provide the desired support during splicing of the tire components assembled when the tire is in cylindrical form as well as to permit their consolidation around the tire beads. At the same time, the tire is able to be shaped to the desired toroidal form and held in a precise location for application of the tread and belt breaker. Building is thus completely carried out in the one continuous sequence of operations on this building drum assembly.

What is claimed is:

1. Apparatus for building pneumatic tires having rigid belt breakers, said apparatus being characterised by the provision of an inflatable elastomeric bladder capable of being deformed between a cylindrical and toroidal form, a plurality of bladder support segments disposed within said bladder and movable in a radial manner whereby said bladder support segments provide a substantially cylindrical internal support for said bladder at one diameter and a further substantially cylindrical internal support for said bladder at a larger diameter, said bladder support segments being arranged in two coaxial rings with bladder support segments of one ring being provided with fingers interengaging with fingers of opposite bladder support segments of the other ring whereby a substantially cylindrical support of variable length is provided and said bladder support segments which are provided with fingers alternating with bladder support segments which do not have fingers and which extend axially for a shorter distance than those with fingers, whereby cavities are formed in the substantially cylindrical surface into which the material of the bladder may be drawn by vacuum.

2. Apparatus according to claim 1 wherein said bladder is provided with ends extending radially inwardly and each terminating in an annular bead, said apparatus including means for gripping the beads to support the bladder.

3. Apparatus according to claim 2 including a shaft assembly, inner clamping rings mounted on the shaft assembly so as to be movable towards and from each other, and outer clamping rings arranged to clamp the beads against the inner clamping rings.

4. Apparatus according to claim 1 including a plurality of outer ring segments disposed to provide substantially cylindrical supports beside the ends of bladder.

5. Apparatus according to claim 4 wherein said outer ring segments are movable in conjunction with the bladder support segments to provide for a substantially cylindrical support of a different diameter.

6. Apparatus according to claim 5 including annular inflatable airbags disposed to move the bladder support segments and outer ring segments radially outwardly by expansion of the airbags, and resilient extended rings engaging the segments and thereby urging them radially inwardly.

7. Apparatus according to claim 6 including a shaft assembly, inner clamping rings mounted on the shaft assembly so as to be movable towards and from each other, characterised in that the bladder in its undistorted condition is in the shape of a cylinder with ends turned radially inwardly and terminating in annular beads, said beads being engaged against the inner clamping rings by means of outer clamping rings connected to the inner clamping rings, and further characterised in that the bladder support segments, outer ring segments and annular airbags are mounted in the inner clamping rings.

8. Apparatus according to claim 4 wherein each outer ring segment has a head which is enlarged in the axial direction, the axially inner face of said head being cut away concavely to provide a feather edge and to lie adjacent to the bladder surface, and the axially outer part of the head having a projection with a radially inner face parallel to the radially outer face, and an end face at right angles thereto.

9. Apparatus according to claim 5 including two bead support rings disposed coaxially with the bladder and segments, one at each end of the bladder and means for moving said bead supported rings in the axial direction.

10. Apparatus according to claim 9 including two bells disposed coaxially with the bladder and segments, one at each end of the bladder and means for moving the bells in the axial direction, said bells being disposed to coact with the bladder when the bladder is expanded to the toroidal shape whereby breaker strips and the tire tread may be made up on the bells and bladder and transferred from the bells to the bladder.

References Cited

UNITED STATES PATENTS

| | | | |
|---|---|---|---|
| 3,111,445 | 11/1963 | Pouilloux et al. | 156—415 XR |
| 3,160,546 | 12/1964 | Burton | 156—415 XR |
| 3,184,361 | 5/1965 | Allitt | 156—416 XR |
| 3,188,260 | 6/1965 | Nebout | 156—416 XR |
| 3,278,362 | 10/1966 | Johannes | 156—415 |
| 3,409,490 | 11/1968 | Pacciarini et al. | 156—415 XR |
| 3,434,897 | 3/1969 | Caretta et al. | 156—132 |

FOREIGN PATENTS 983,349   2/1965   Great Britain.

BENJAMIN A. BORCHELT, Primary Examiner

S. C. BENTLEY, Assistant Examiner